(12) United States Patent
Capps et al.

(10) Patent No.: US 6,353,705 B1
(45) Date of Patent: Mar. 5, 2002

(54) SPEED CONTROL CIRCUIT OF A DIRECT CURRENT MOTOR

(75) Inventors: John Capps, Buford, GA (US); Yutaka Matsunaga, Anjo (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 09/360,589

(22) Filed: Jul. 26, 1999

(51) Int. Cl.⁷ ............................. H02K 7/14; H02P 7/29
(52) U.S. Cl. ..................... 388/830; 388/831; 388/915; 388/937
(58) Field of Search ................... 388/809, 816, 388/811, 819, 828, 829, 830, 831, 907.5, 915, 937; 318/268

(56) References Cited

U.S. PATENT DOCUMENTS

| | | | |
|---|---|---|---|
| 4,317,578 A | * | 3/1982 | Welch |
| 4,893,067 A | * | 1/1990 | Bhagwat et al. ............ 388/817 |
| 4,902,953 A | * | 2/1990 | Kraft et al. .................. 318/663 |
| 5,014,793 A | * | 5/1991 | Germanton et al. ........... 173/12 |
| 5,614,798 A | * | 3/1997 | Zydek et al. ................. 318/434 |
| 6,048,345 A | * | 4/2000 | Berke et al. .................. 606/85 |

FOREIGN PATENT DOCUMENTS

JP 04351488 A 12/1992

* cited by examiner

*Primary Examiner*—Bentsu Ro
(74) *Attorney, Agent, or Firm*—Welsh & Katz, Ltd.; Thomas W. Tolpin

(57) ABSTRACT

A speed control circuit of a direct current motor comprises a switching regulator IC 10. The switching regulator IC 10 is composed of a reference voltage generator 12 which generates a reference voltage of 5V, a first operational amplifier OP1, a second operational amplifier OP2, a third operational amplifier OP3, a triangular wave generator 14 which generates a triangular wave, and a transistor TR1. The speed control circuit is constructed using a general switching regulator IC; therefore, it is possible to cheaply and readily manufacture the speed control circuit of the direct current motor.

4 Claims, 6 Drawing Sheets

SPEED CONTROL CIRCUIT OF A DIRECT CURRENT MOTOR

BACKGROUND OF THE INVENTION

1. Field of the Invention

The present invention relates to a speed control circuit of a direct current motor for a battery-operated type electric powered tool.

2. Description of the Related Art

In a charging type electric powered tool, in the case of changing a motor speed in accordance with a dial setting value, a speed control circuit is mounted in the electric powered tool. By using an already existing IC (Integrated Circuit) as much as possible, it is possible to readily manufacture the speed control circuit.

However, an IC designed for only speed control circuit of a direct current motor is constructed as an IC for a servo motor used for position control, which detects a rotational speed of a motor so as to carry out a speed control with the use of an encoder or the like. For this reason, in the case where the aforesaid IC has been applied to an electric powered tool which roughly increases and decreases the rotational speed, the IC includes many functions which are not used; therefore, it is very expensive to apply the aforesaid IC to the electric powered tool Thus, a speed control circuit of the electric powered tool is constructed in a manner of combining a plurality of general ICs Including an operational amplifier or the like; as a result, it is impossible to cheaply and readily manufacture the speed control circuit of the electric powered tool.

SUMMARY OF THE INVENTION

The present invention has been made in order to solve the aforesaid problem in the prior art. It is, therefore, an object of the present invention is to provide a speed control circuit of a direct current motor for an electric powered tool, which is capable of being readily constructed.

A speed control circuit of a direct current motor, which applies a voltage of battery so as to control a rotational speed of a direct current motor of an electric powered tool according to the present invention, comprising:

a switching regulator IC generating a variable potential in accordance with a command potential;

an electrically energizing control element connected to an output side of said switching regulator IC, and turning on and off a current to said direct current motor from said battery; and a command potential applying device connected to an input side of said switching regulator IC, and applying a potential corresponding to a (dial) setting value.

According to the present invention, a general switching regulator IC is used to construct a speed control circuit of the direct current motor; therefore, it is possible to cheaply and readily manufacture the speed control circuit of the direct current motor. Further, the switching regulator IC has a wide source (supply) voltage range; therefore, there is an advantage of separately requiring no step-down power circuit even if a higher voltage battery is used.

According to a preferred embodiment of the present invention, the speed control circuit of a direct current motor, said switching regulator IC includes:

a reference voltage generator generating a reference voltage:

a first operational amplifier making a comparison between a potential from said reference voltage generator and a potential from said command potential applying device;

a triangular wave generator; and a second operational amplifier making a comparison between a triangular wave from said triangular wave generator and an output from said first operational amplifier, and outputting a control signal to said electrically energizing control element. It is possible to use the whole functions of the switching regulator IC without wasting any section.

A speed control circuit of a direct current motor, which applies a voltage of battery so as to control a rotational speed of a direct current motor of an electric powered tool according to the present invention, comprising:

a switching regulator IC generating a variable potential in accordance with a first command potential applied to a first input and a second command potential applied to a second input;

an electrically energizing control element connected to an output side of said switching regulator IC and turning on and off a current to said direct current motor from said battery;

a first command potential applying device applying a potential corresponding to a (dial) setting value to said first input side; and a second command potential applying device applying a potential corresponding to a pulled position of a trigger of electric powered tool to said second input side.

Moreover, according to the present invention, a general switching regulator IC is used to construct a speed control circuit of the direct current motor; therefore, it is possible to cheaply and readily manufacture the speed control circuit of the direct current motor. A switching regulator IC, which generates a variable potential in accordance with a first command potential applied to a first input and a second command potential applied to a second input, is used; for this reason, a potential corresponding to a dial setting value of a first command potential applying device is applied to the first input side, and thereby, a speed of the motor can be adjusted in accordance with the setting value of the dial. Further, a potential corresponding to a pulled position of a trigger of the electric powered tool is applied to the second input side, and thereby, a speed of the motor can be adjusted in accordance with the pulled position of the trigger. Also, the switching regulator IC has a wide source (supply) voltage range; therefore, there is an advantage of separately requiring no step-down power circuit even if a higher voltage battery is used.

According to a preferred embodiment of the present invention, the speed control circuit of a direct current motor, said switching regulator IC includes:

a reference voltage generator generating a reference voltage;

a first operational amplifier making a comparison between a potential from said reference voltage generator and a potential from said first input;

a third operational amplifier making a comparison between a potential from said reference voltage generator and a potential from said second input;

a triangular wave generator; and a second operational amplifier making a comparison between a triangular wave from said triangular wave generator and outputs from said first operational amplifier and said third operational amplifier, and outputting a control signal to said electrically energizing control element. It is possible to use all the functions of the switching regulator IC.

According to the preferred embodiment of the present invention, in the switching regulator IC, a second operational amplifier outputs a control signal to an electrically energizing control element on the basis of a potential value on a lower side of which a potential from a first operational amplifier or a potential from a third operational amplifier Thus, a motor speed can be adjusted in accordance with a pulled position of the trigger in a range of dial set in the first command potential applying device.

DETAILED DESCRIPTION OF THE PREFERRED EMBODIMENTS

A control circuit according to the preferred embodiments of the present invention will be described below with reference to the accompanying drawings.

Figure 1:
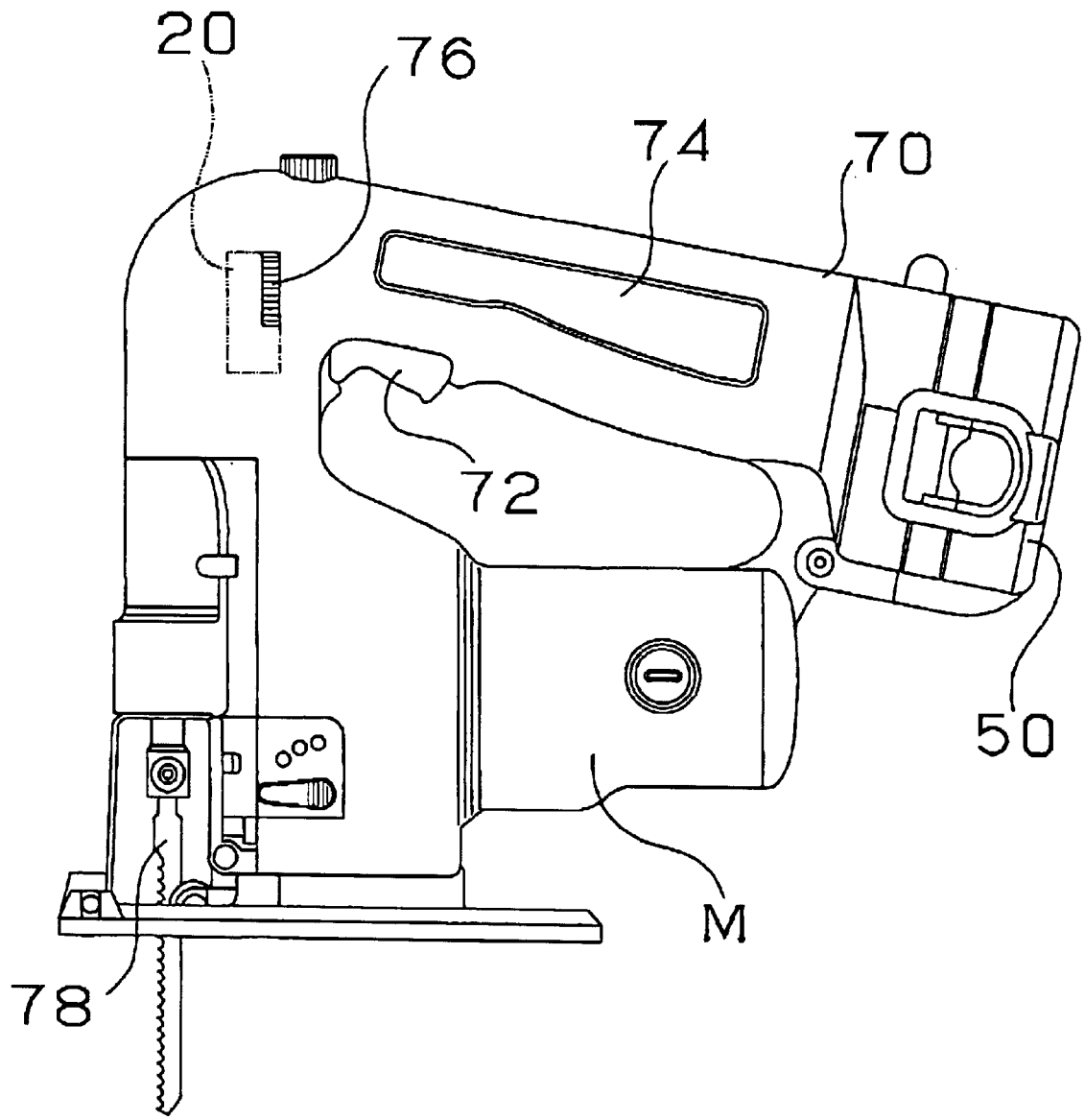
FIG. 1 is a side view showing a charging type jigsaw using a speed control circuit according to a first embodiment of the present invention.

FIG. 1 shows a charging type jigsaw using a speed control circuit of a direct current motor according to a first embodiment of the present invention. A charging type jigsaw 70 is constructed in a manner that a removable battery pack 50 is housed in a gripper portion 74, and a speed control circuit 20 applies a potential corresponding to a setting value of a dial 76 to a direct current motor M so as to adjust a number of stroke of a blade 78. In this case, the direct current motor M is turned on and off by means of a trigger 72.

Figure 2:
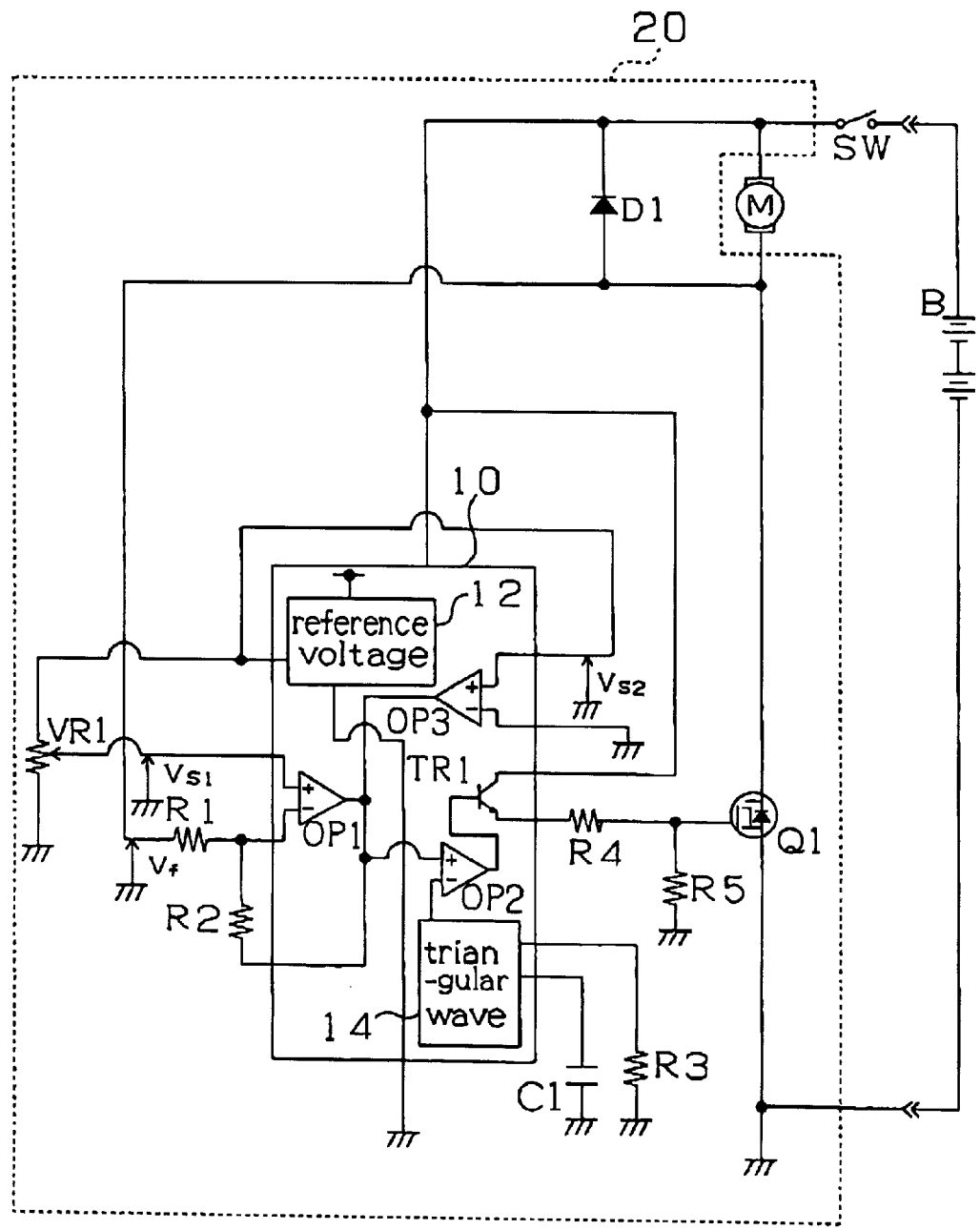
FIG. 2 is a circuit diagram showing the speed control circuit of a direct current motor according to a first embodiment of the present invention.

FIG. 2 shows a speed control circuit of the first embodiment. A potential of a battery B in the battery pack 50 is applied to the direct current motor M via a FET (Q1). A main switch SW is interposed between the direct current motor M and the battery B. Moreover, a diode D1 is connected parallel with the direct current motor M.

The speed control circuit 20 comprises a switching regulator IC 10. For example, a MOTOROLA MC34060 may used as the switching regulator IC. The switching regulator IC 10 includes a reference voltage generator 12 which generates a reference voltage of 5V, a first operational amplifier OP1, a second operational amplifier OP2, a third operational amplifier OP3, a triangular wave generator 14 which generates a triangular wave, and a transistor TR1.

A potential of 5V from the reference voltage generator 12 is connected to a non-inversion input of the first operational amplifier OP1 via a variable resistor VR1. The variable resistor VR1 varies a resistance value in accordance with a setting value of the dial 76 shown in FIG. 1, and a potential (command voltage Vs1) corresponding to the setting value of the dial 76 is applied to the non-inversion input of the first operational amplifier OP1. On the other hand, a terminal potential, which is proportional to a rotational speed of the direct current motor M, is applied as a feedback reference voltage Vf to an inversion input of the first operational amplifier OP1 via resistors R6 and R1. Then, the first operational amplifier OP1 outputs a difference between the command voltage Vs1 and the feedback reference voltage Vf to a non-inversion input of the second operational amplifier OP2. More specifically, as shown in a waveform diagram of FIG. 3, when the difference between the command voltage Vs1 and the feedback reference voltage Vf is great, the first operational amplifier OP1 outputs a low potential; on the other hand, when the above difference between these voltages is small, it outputs a high potential. In this case, the output potential of the first operational amplifier OP1 is fed back to an inversion input via a resistor R2.

Figure 3:
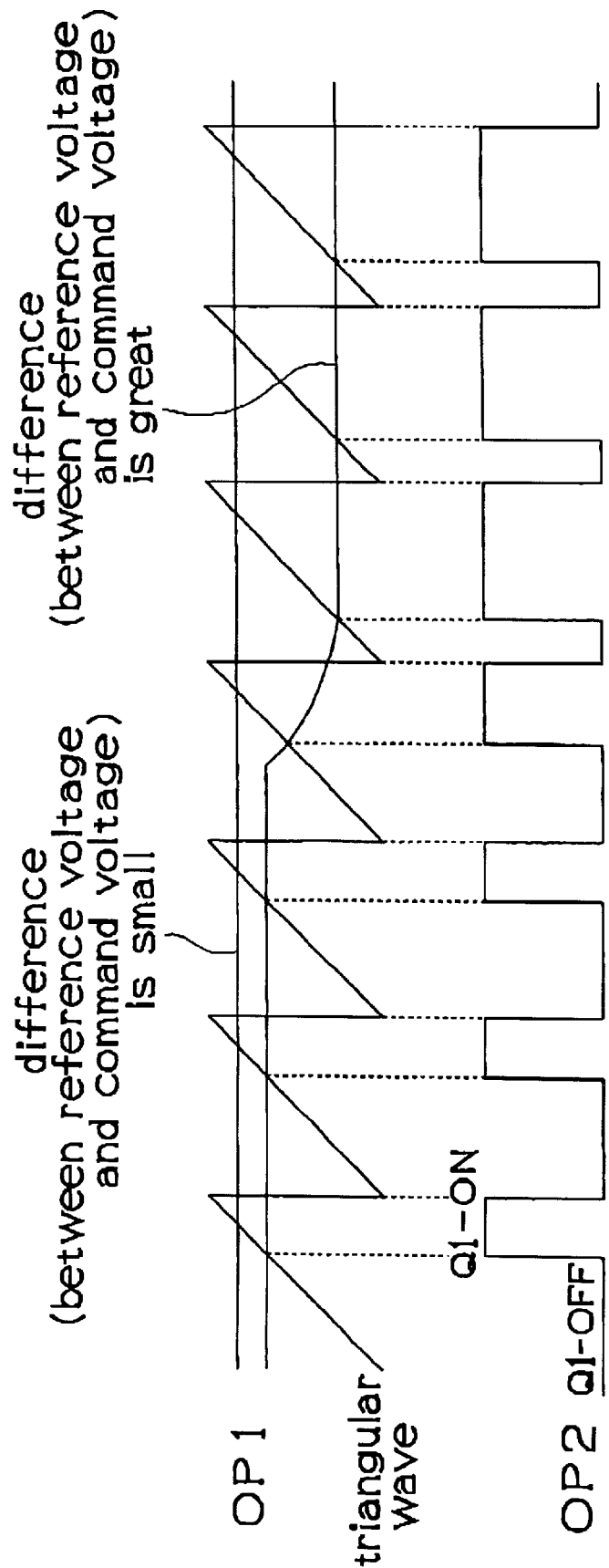
FIG. 3 is a waveform diagram of an operational amplifier and a triangular wave generator of the speed control circuit shown in FIG. 2.

The triangular wave generator 14 generates a triangular wave having a frequency set by a capacitor C2 and a resistor R3, as shown in FIG. 3, and then, applies the triangular wave to an inversion input of the second operational amplifier OP2. Moreover, the triangular wave generator 14 is set to a low value of 100 Hz in order to reduce a switching loss of the FET (Q1). As shown in FIG. 3, the second operational amplifier OP2 generates an output signal (PWM signal which becomes high when the output from the first operational amplifier OP1 goes beyond the triangular wave. More specifically, when the difference, between the command voltage Vs1 and the feedback reference voltage Vf is great and a low potential is applied from the first operational amplifier OP1, the second operational amplifier OP2 generates a pulse having a long on-time. The pulse having a long on-time is applied to a gate of the FET (Q1) via the transistor TR1 and a resistor R4 so as to electrically energize the FET for a long time, and to make high an average potential applied to the motor M. On the other hand, when the difference between the command voltage Vs1 and the feedback reference voltage Vf is small and a high potential is applied from the first operational amplifier OP1, the second operational amplifier OP2 generates a pulse having a short on-time. The pulse having a short on-time is applied to a gate of the FET (Q1) via the transistor TR1 and a resistor R4 so as to electrically energize the FET for a short time, and to make low an average potential applied to the motor M. Whereby it is possible to control a rotational speed of the direct current motor M in accordance with a setting value of the dial 76.

In this first embodiment, a general switching regulator IC is used to construct a speed control circuit of the direct current motor; therefore, it is possible to cheaply and readily manufacture the speed control circuit of the direct current motor. Further, the switching regulator IC has a wide source (supply) voltage range (7 to 40V in MC34060): therefore, there is an advantage of separately requiring no step-down power circuit even if a battery of high voltage is used, Moreover, in this first embodiment, a number of stroke of the blade 78 is variable in accordance with a setting value of the dial 76. A resistance value of the variable resistor VR1 is changed in accordance with a pulled position of the trigger in place of the setting value of dial 76, and thereby, it is possible to vary the number of stroke.

Further, the switching regulator IC 10 used in this first embodiment is constructed so as to generate two kinds of potentials by an input on the first operational amplifier OP1 side and an input on the third operational amplifier OP3. For example, a predetermined potential is applied to the first operational amplifier OP1, and thereby, it is possible to generate a potential of Vs1; on the other hand, a predetermined potential lower than the above predetermined potential is applied to the third operational amplifier OP3, and thereby, it Is possible to generate a potential of Vs2. More specifically, an output of the first operational amplifier OP1 and an output of the third operational amplifier OP3 are connected, and thereby, the second operational amplifier OP2 outputs a control signal on the basis of a potential value on a lower side of which the potential from the first operational amplifier OP1 or the potential from the third operational amplifier OP3. Thus, in this embodiment, a potential of 5V from the reference voltage generator 12 is applied to the non-inversion input of the third operational amplifier OP3; on the other hand, a ground potential is applied to the inversion input thereof. Whereby the third operational amplifier OP3 always outputs a potential higher than the output potential of the first operational amplifier OP1 so as not to give an influence to an operation of the first operational amplifier OP1.

Figure 4:
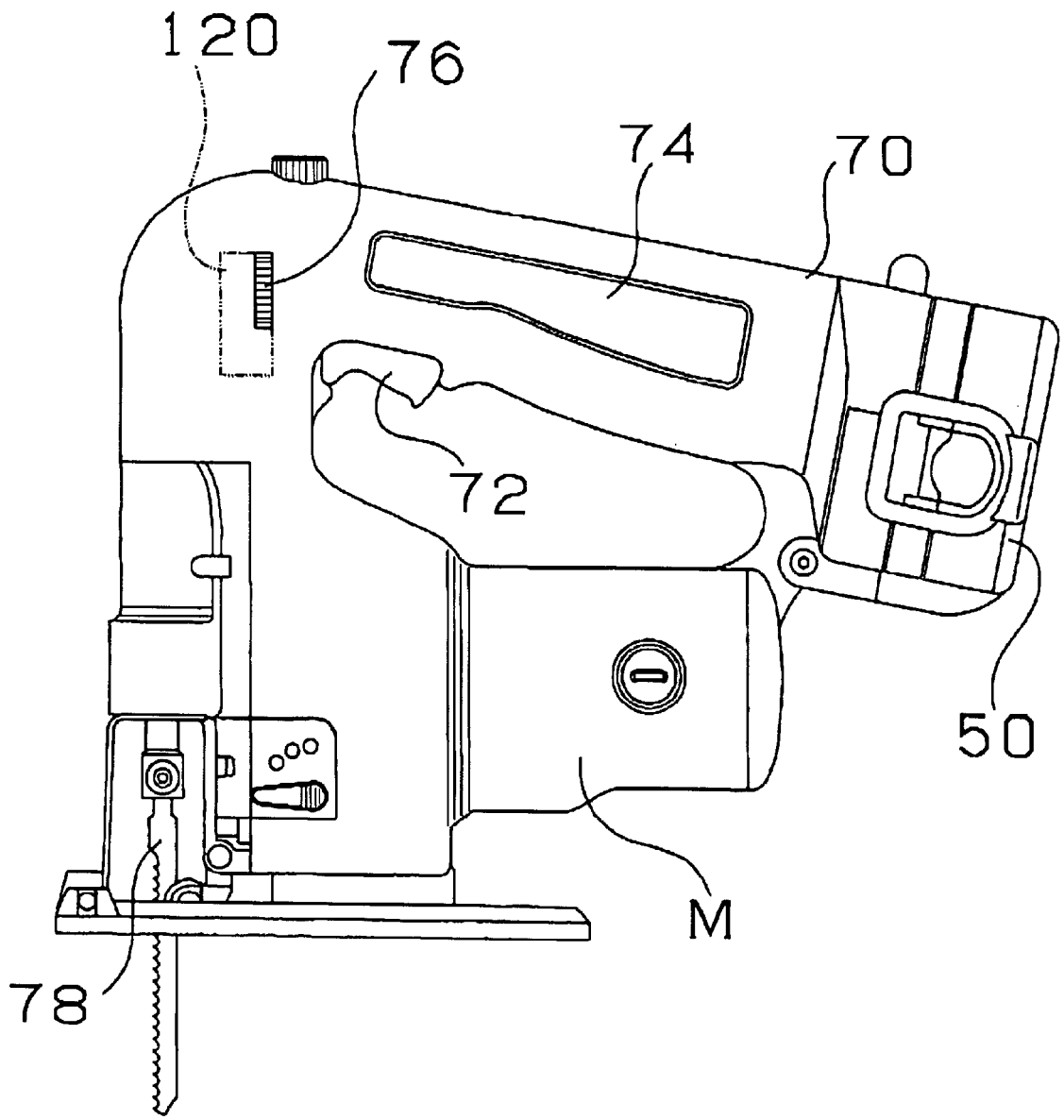
FIG. 4 is a side view showing a charging type jigsaw using a speed control circuit of a direct current motor according to a second embodiment of the present invention.
Figure 6:
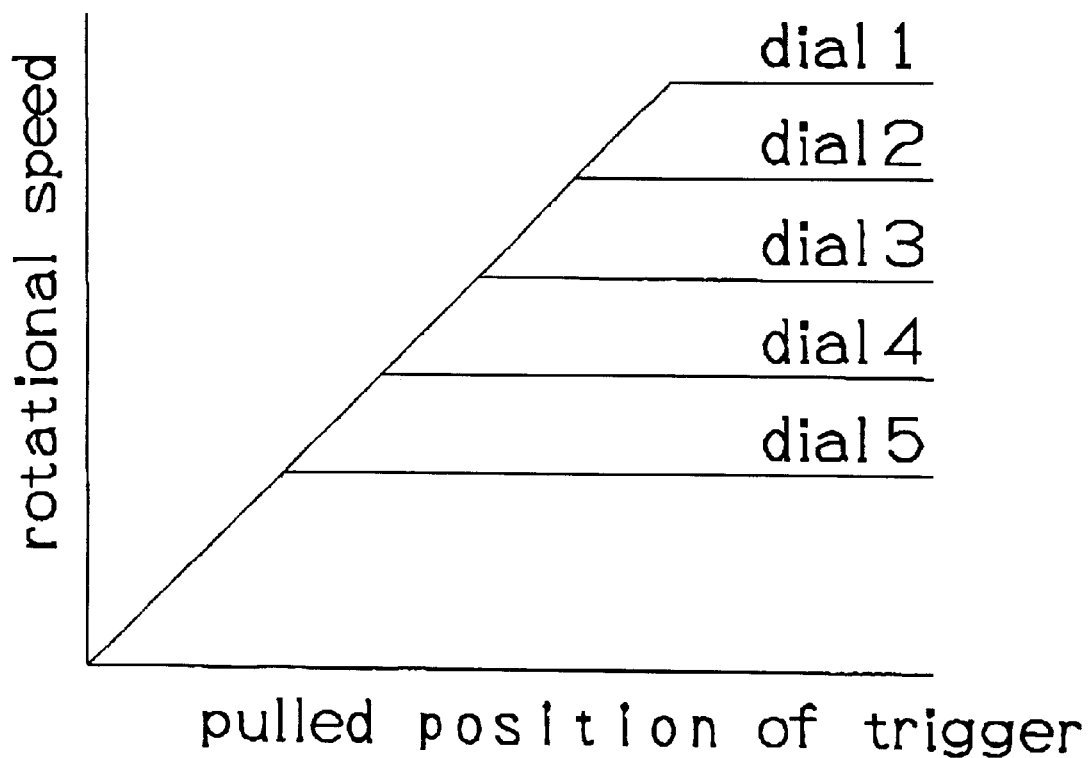
FIG. 6 is a graph showing a relationship between a pulled position of a trigger and a motor rotational speed in the speed control circuit according to the second embodiment.

Next, the following is a description on a speed control circuit of a direct current motor according to a second embodiment of the present invention. FIG. 4 shows a charging type jigsaw using a speed control circuit of a direct current motor according to a second embodiment. A charging type jigsaw 170 is constructed in a manner that a removable battery pack 50 is housed in a gripper portion 74. and a speed control circuit 120 applies a potential corresponding to a pull of a trigger 72 to a direct current motor M so as to adjust a number of stroke of a blade 78. Further, the charging type jigsaw 170 is attached with a dial 76 so that a number of stroke is switched over into five stages, that is, dial 1 to dial 5. More specifically, as shown in FIG. 6, a rotational speed of the motor is adjusted in accordance with a pulled position of the trigger and a setting value of the dial 76. When the dial is set to "1", the rotational speed of the motor does not becomes a relatively low number of stroke or more, and when the dial is set to "5", it is set so as to transfer to a high number of stroke when the trigger is pulled.

Figure 5:
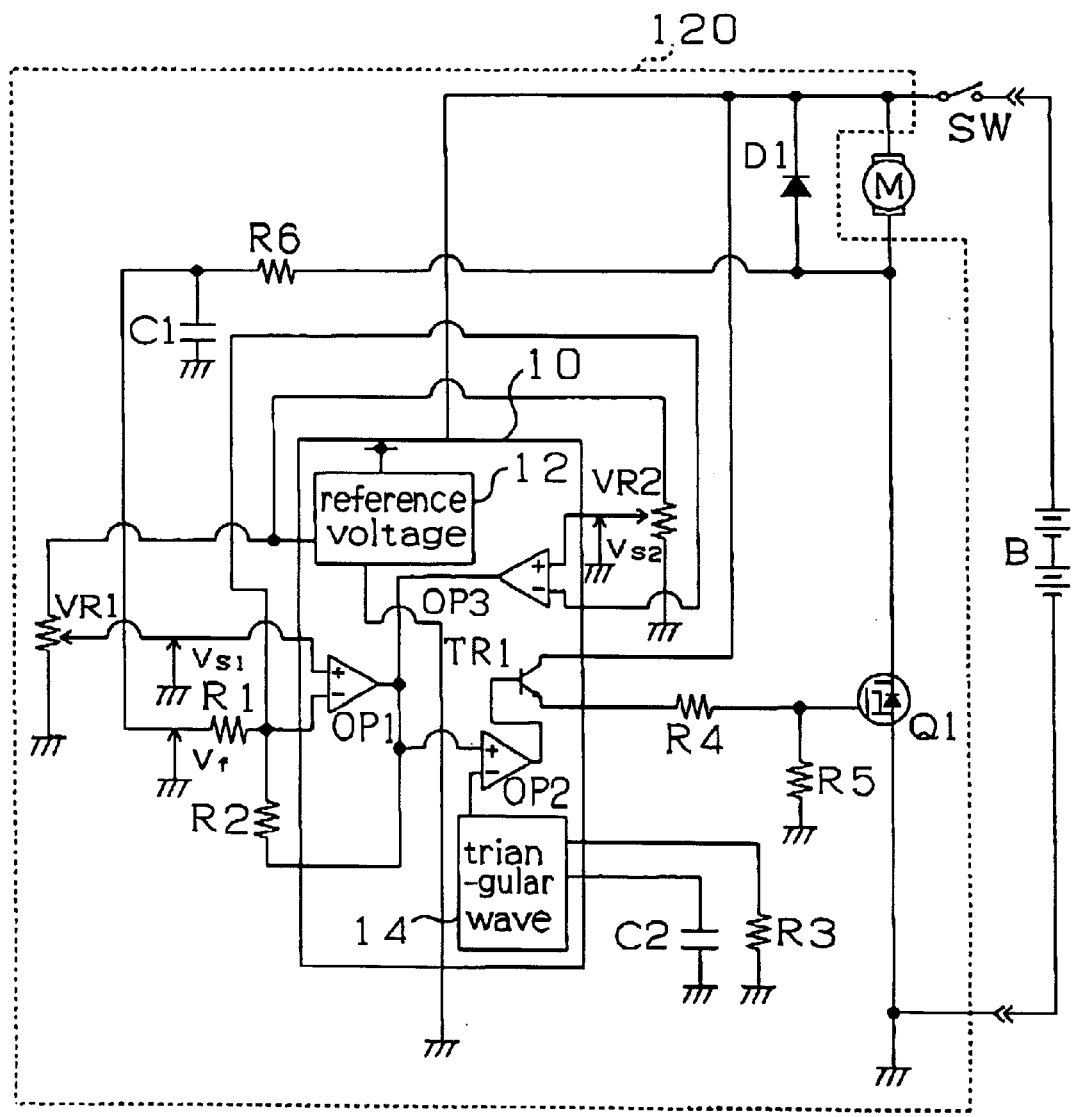
FIG. 5 is a circuit diagram showing the speed control circuit of a direct current motor according to a second embodiment of the present invention.

FIG. 5 shows a speed control circuit of the second embodiment, The speed control circuit of this second embodiment is constructed using the same switching regulator IC 10 as the first embodiment. In the foregoing first embodiment, the third operational amplifier OP3 of the switching regulator IC 10 has not been used. However, in this second embodiment, a variable resistor VR 2 connected to the above dial 76 Is connected to the third operational amplifier OP3.

A potential of 5V from the reference voltage generator 12 Is connected to a non-inversion input of the third operational amplifier OP3 via a variable resistor VR2 The variable resistor VR2 varies a resistance value in accordance with a pulled position of the trigger 72, and a potential (command voltage Vs2) corresponding to the pulled position of the trigger 72 is applied to the non-inversion input of the third operational amplifier OP3. On the other hand, a terminal potential, which is proportional to a rotational speed of the direct current motor M, is applied as a feedback reference voltage Vf to an inversion input of the third operational amplifier OP3 via resistors R6 and R1. Whereby the third operational amplifier OP3 outputs a difference between the command voltage Vs2 and the feedback reference voltage Vf to a non-inversion input of the second operational amplifier OP2.

As described above, the output of the first operational amplifier OP1 and the output of the third operational amplifier OP3 are connected, and thereby, the switching regulator IC 10 is constructed so that the second operational amplifier OP2 outputs a control signal on the basis of a potential value on the lower side of which the potential from the first operational amplifier OP1 or the potential from the third operational amplifier OP3. Thus, it is possible to adjust a speed of the direct current motor M in accordance with a pulled position of the trigger 72 within the upper limit value set in the dial 76 as shown in FIG. 6, that is, within a range of the potential of the first operational amplifier OP1.

In this second embodiment, the speed control circuit of the direct current motor is constructed using the general switching regulator IC; therefore, it is possible to cheaply and readily manufacture the speed control circuit of the direct current motor. Further, the speed control circuit of the direct current motor is constructed using the PWM switching regulator IC which can vary a pulse width in accordance with the command potential applied to the non-inversion input of the first operational amplifier OP1 and the command potential applied to the non-inversion input of the third operational amplifier OP3 Thus, a potential corresponding to a pulled position of the trigger of an electric powered tool is applied to the third operational amplifier OP3, and thereby, it is possible to adjust a speed of motor in accordance with the pulled position of the trigger 72, and further, a potential corresponding to a setting value of the dial 76 is applied to the operational amplifier OP1, and thereby, it is possible to set the upper limit speed of the motor. In addition, the switching regulator IC has a wide source (supply) voltage range: therefore, there is an advantage of requiring separate no step-down power circuit even if a higher voltage battery is used.

The above embodiments have shown an example in which the speed control circuit of the present invention comprises an MC34060. Of course, the speed control circuit may be constructed using various switching regulator ICs. Moreover, in the above embodiment, the speed control circuit of the present invention has been applied to a charging type jigsaw Further, the speed control circuit of the present invention is applicable to other electric powered tools, for example, a charging type reciprocation saw, a charging type hammer drill, a charging type impact driver, a charging type drill or the like.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A speed control circuit of a direct current motor, which applies a voltage of battery so as to control a rotational speed of a direct current motor of an electric powered tool, comprising:

a switching regulator IC generating a variable potential in accordance with a first command potential applied to a first input and a second command potential applied to a second input;

an electrically energizing control element connected to an output side of said switching regulator IC, and turning on and off a current to said direct current motor from said battery;

a first command potential applying device applying a potential corresponding to a (dial) setting value to said first input side; and a second command potential applying device applying a potential corresponding to a pulled position of a trigger of electric powered tool to said second input side.

2. The speed control circuit of a direct current motor according to claim 1, wherein said switching regulator IC includes:

a reference voltage generator generating a reference voltage;

a first operational amplifier making a comparison between a potential from said reference voltage generator and a potential from said first input;

a third operational amplifier making a comparison between a potential from said reference voltage generator and a potential from said second input:

a triangular wave generator; and a second operational amplifier making a comparison between a triangular wave from said triangular wave generator and outputs from said first operational amplifier and said third operational amplifier, and outputting a control signal to said electrically energizing control element.

3. The speed control circuit of a direct current motor according to claim 2, wherein said switching regulator IC is constructed so that said second operational amplifier outputs a control signal to said electrically energizing control element on the basis of a potential value of the lower side of which a potential from said first operational amplifier or a potential from said third operational amplifier.

4. A speed control circuit of a direct current motor, which applies a voltage of battery so as to control a rotational speed of a direct current motor of an electric powered tool, comprising:

a switching regulator IC generating a variable potential in accordance with a command potential;

an electrically energizing control element connected to an output side of said switching regulator IC, and turning on and off a current to said direct current motor from said battery;

a command potential applying device connected to an input side of said switching regulator IC, and applying a potential corresponding to a (dial) setting value; and a second command potential applying device applying a potential corresponding to a pulled position of a trigger of said electric powered tool to a second input side of said switching regulator IC.

* * * * *